US009928548B2

(12) United States Patent
Schmidt et al.

(10) Patent No.: US 9,928,548 B2
(45) Date of Patent: Mar. 27, 2018

(54) GUARANTOR MORTGAGES

(71) Applicant: Royal Bank of Canada, Montreal (CA)

(72) Inventors: Michael K. Schmidt, Toronto (CA); Amir Tehrani, Oakville (CA)

(73) Assignee: ROYAL BANK OF CANADA, Montreal (CA)

( * ) Notice: Subject to any disclaimer, the term of this patent is extended or adjusted under 35 U.S.C. 154(b) by 560 days.

(21) Appl. No.: 14/194,630

(22) Filed: Feb. 28, 2014

(65) Prior Publication Data

US 2014/0249992 A1 Sep. 4, 2014

Related U.S. Application Data

(60) Provisional application No. 61/771,509, filed on Mar. 1, 2013.

(51) Int. Cl.
*G06Q 40/00* (2012.01)
*G06Q 40/02* (2012.01)

(52) U.S. Cl.
CPC ................... *G06Q 40/025* (2013.01)

(58) Field of Classification Search
CPC ....................................................... G06Q 40/00
USPC ............................................................. 705/35
See application file for complete search history.

(56) References Cited

U.S. PATENT DOCUMENTS

| | | | | |
|---|---|---|---|---|
| 6,088,686 A * | 7/2000 | Walker | ................ | G06Q 20/10 235/375 |
| 7,693,782 B1 | 4/2010 | Stricker et al. | | |
| 7,860,781 B1 * | 12/2010 | Bodi | ................ | G06Q 40/00 705/35 |
| 8,185,466 B2 * | 5/2012 | Martinez | ................ | G06Q 40/00 705/37 |
| 8,626,644 B2 * | 1/2014 | Greig, Jr. | ................ | G06Q 40/00 235/375 |
| 2002/0069160 A1 * | 6/2002 | Olin | ................ | G06Q 40/00 705/38 |
| 2002/0091621 A1 * | 7/2002 | Conklin | ................ | G06Q 20/10 705/37 |
| 2003/0009409 A1 * | 1/2003 | Horner | ................ | G06Q 40/02 705/36 R |
| 2003/0144950 A1 * | 7/2003 | O'Brien | ................ | G06Q 40/02 705/38 |
| 2005/0080722 A1 * | 4/2005 | Kemper | ................ | G06Q 40/025 705/38 |
| 2005/0149421 A1 * | 7/2005 | Marlowe-Noren | .... | G06Q 40/02 705/35 |
| 2005/0273406 A1 * | 12/2005 | Lebda | ................ | G06Q 40/02 705/35 |
| 2007/0016519 A1 * | 1/2007 | Blount, Jr. | ................ | G06Q 10/087 705/38 |

(Continued)

OTHER PUBLICATIONS

CIPO, Office Action for CA Application No. 2,844,318 dated Nov. 2, 2017.

*Primary Examiner* — Kirsten Apple
(74) *Attorney, Agent, or Firm* — Norton Rose Fulbright Canada LLP

(57) ABSTRACT

Systems, methods, and machine-interpretable programming or other instruction products for guarantor mortgages. In particular, the disclosure provides methods, apparatus, and programming product for the processing of improved transfer of monetary value through innovative loan processes.

50 Claims, 14 Drawing Sheets

(56) References Cited

U.S. PATENT DOCUMENTS

| | | | |
|---|---|---|---|
| 2007/0142925 A1* | 6/2007 | Heinzmann | G06F 17/30445 700/1 |
| 2007/0192237 A1* | 8/2007 | Duoos | G06Q 40/025 705/38 |
| 2008/0052224 A1 | 2/2008 | Parker | |
| 2008/0126267 A1* | 5/2008 | Rosen | G06Q 40/06 705/36 R |
| 2008/0243569 A1* | 10/2008 | Hadden | G06Q 20/10 705/38 |
| 2008/0249809 A1* | 10/2008 | Rosen | G06Q 40/00 705/4 |
| 2010/0228651 A1* | 9/2010 | Becerra | G06Q 30/04 705/34 |
| 2011/0191233 A1* | 8/2011 | Russo | G06Q 40/04 705/37 |
| 2012/0278256 A1* | 11/2012 | Williams | G06Q 40/06 705/36 R |
| 2014/0081672 A1* | 3/2014 | Chawla | G06Q 40/08 705/4 |
| 2014/0180907 A1* | 6/2014 | Blank | G06Q 40/025 705/38 |

\* cited by examiner

RBC Guarantor Mortgage Model 2 – No Mortgage Insurer

Proposed Model

- Borrower is not required to provide a down payment.
- Guarantor(s) puts in collateral up to an amount that removes the requirement for mortgage insurance premiums (example: minimum 20% of home value).
- Borrower pays no mortgage insurance premium.
- Deposit is held as collateral against the mortgage for a fixed number of years (usually 5 or until loan-to-value is less than high ratio threshold, example: <80%) at which time the deposit plus accrued interest is returned to the guarantor.
- Bank holds first right to collateral in event of default.

Example:
Standard High Ratio Mortgage

95% Loan-to-Value
Mortgage Insurance Premium: 2.75%

Guarantor Mortgage Model 2 @ 20%

Minimum 20% Guarantor Deposit
Perceived 80% Loan-to-Value
No Mortgage Insurance Premium Required

FIG. 8

Guarantor Mortgage Model 3 – No Mortgage Insurer

Proposed Model

- An individual(s) lends borrower funds for their down payment, removing the requirement for mortgage insurance (example: 20% of the home value).

- Borrower pays no mortgage insurance premium.

- Bank manages the repayment of the loan to the individual lender(s) over time. When the borrower makes their monthly mortgage payment, included in the payment will be a loan repayment (potentially including interest) to the individual lender(s).

- Scheduled payments will reduce the mortgage in line with its amortization schedule and repays the individual lender(s) in line with a separate amortization schedule structured for the loan.

Example:
Standard High Ratio Mortgage

| 5% | 95% Loan-to-Value |
| --- | --- |
| | Mortgage Insurance Premium [2.75%] |

Guarantor Mortgage Model 3 @ 20%

| Minimum 20% Lent to borrower | Perceived 80% Loan-to-Value |
| --- | --- |
| | No Mortgage Insurance Premium Required |

FIG. 10

Variations on Models

Variables to account for in each model

- Percentage amount that guarantor(s)/individual lender(s) put up as collateral.
- The type of account the collateral is held in. Some examples:
  - GICs
  - High Interest Savings Account
  - Registered Account
- The type of collateral used. Some examples:
  - Cash
  - Stocks
  - Bonds
  - Insurance Policies
  - Equity in Property (Primary Residence)
  - Equity in Property (Investment or Vacation Property)
- The interest rate/incentive paid to the guarantor(s)/individual lender(s).
- How the collateral is paid out: frequency, amount, time.
- Who can serve as guarantor(s)/individual lender(s): family, friends, etc.
- The number of guarantors/individual lenders that can participate.

FIG. 12

GUARANTOR MORTGAGES

TECHNICAL FIELD

In various aspects the present disclosure relates to both processes and systems configured for the transfer of wealth via specialized mortgage loan arrangements. Such transfer may be accomplished by any suitable means, but is most effectively and efficiently accomplished by secure transfer of data representing discrete amounts of currency via specialized signal and/or data processing and communications systems.

Aspects of the material disclosed in this application relate to the holding, transfer, and/or administration of currencies and other forms of wealth, and specialized signal and/or data processing and communications systems for doing so. Aspects of such holding, transfer, and/or administration may be subject to regulation by governmental and other agencies. The disclosure herein is made solely in terms of logical, economic, and communications possibilities, without regard to statutory, regulatory, or other legal considerations. Nothing herein is intended as a statement or representation that any system, method or process proposed or discussed herein, or the use thereof, does or does not comply with any statute, law, regulation, or other legal requirement in any jurisdiction; nor should it be taken or construed as doing so.

SUMMARY OF THE INVENTION

In various aspects, the disclosure provides methods, apparatus, and programming product for the processing of improved transfer of monetary value through innovative loan processes.

In accordance with an embodiment of the invention, a computer-implemented method performed by at least one data processor, for executing machine-interpretable instructions for a guarantor mortgage, the method comprising:
receiving one or more data sets providing borrower information relevant to a request for a mortgage loan;
receiving one or more data sets providing information about one or more collateral amounts to be provided by one or more guarantors as collateral in connection with the request for a mortgage loan, wherein the collateral is supported by one or more assets;
processing instructions for execution of at least a portion of a data process executable by one or more networked computing resources, the data process including calculation of one or more mortgage interest rates for a guarantor mortgage based upon the one or more data sets providing borrower information and the one or more data sets providing information about the one or more assets to be provided as collateral;
generating signals for providing the one or more mortgage interest rates to the one or more borrowers and to the one or more guarantors;
receiving from the one or more borrowers and the one or more guarantors computer signals representing a selection of a particular mortgage interest rate; and
processing instructions for establishing, on a lender computer system, one or more data parameters representing a guarantor mortgage based on (i) the selected mortgage interest rate, (ii) the one or more data sets providing borrower information, and (iii) the one or more data sets providing information about one or more assets to be provided as collateral.

In accordance with an embodiment of the invention, the method may further comprise establishing one or more pre-determined conditions for the full or partial release of the collateral.

In accordance with an embodiment of the invention, the method may further comprise generating periodically or receiving periodically at least one of information regarding the repayment of the guarantor mortgage, and information regarding the value of one or more assets associated with the guarantor mortgage relative to an outstanding mortgage loan amount; and based on the at least one of the information regarding the repayment of the guarantor mortgage and the information regarding the value of one or more assets associated with the guarantor mortgage relative to an outstanding mortgage loan amount, when the one or more pre-determined conditions for the full or partial release of the collateral are satisfied, applying one or more rules to the guarantor mortgage for the full or the partial release of the collateral.

BRIEF DESCRIPTION OF THE DRAWINGS

The invention is illustrated in the figures of the accompanying drawings, which are meant to be exemplary and not limiting, and in which like references are intended to refer to like or corresponding parts.

FIG. 8, according to some embodiments of the invention, illustrates an example mortgage model where, in contrast to a standard high LOAN-TO-VALUE ratio mortgage, the guarantor(s) provides enough of a deposit such that mortgage insurance premiums are unnecessary.

FIG. 10, according to some embodiments of the invention, illustrates an example mortgage model where, in contrast to a standard high LOAN-TO-VALUE ratio mortgage, a guarantor(s) lends funds to the borrower(s) whereby the bank manages the repayment of the loan to the guarantor(s) over time.

FIG. 12, according to some embodiments of the invention, provides potential variations on the mortgage models, including but not limited to, percentages that will be put up as collateral, types of account collateral may be held in, types of collateral(s) that may be used, interest rates/incentives paid to guarantors or individual lenders, characteristics of collateral repayment (frequency, time, amount), characteristics of potential guarantors or lenders, and the number of guarantors/lenders that may participate.

DETAILED DESCRIPTION OF THE PREFERRED EMBODIMENTS

Various embodiments of methods, systems, and apparatus according to the invention are described through reference to the drawings.

A guarantor mortgage is a device used to guarantee a loan, whereby a party external to the borrower and the lender provides additional collateral to guarantee the loan.

Variants of guarantor mortgages are also contemplated by this disclosure. As a non-limiting example, a third-party lender may loan funds directly to a borrower to use as a down payment, and this third-party lender may wish to be have the loan repaid as part of, or in addition to, the monthly mortgage payment periods during the period at which the loan will be active.

In a simple, non-limiting example, a mother may wish to act as a guarantor for her son's mortgage for his first home purchase. In this simple non-limiting example, the mother would then be liable for some or all of the outstanding value of the mortgage incurred by her son, in the event that her son fails to make payments to the bank. In certain situations, lenders have taken security interests over collateral provided by guarantors; the collateral being available to be lender in the event that the lender must foreclose or otherwise terminate the loan for non-payment, default, or a variety of other reasons.

In some embodiments of the invention, processes, methods and systems are provided to implement guarantor mortgages.

Figure 1:
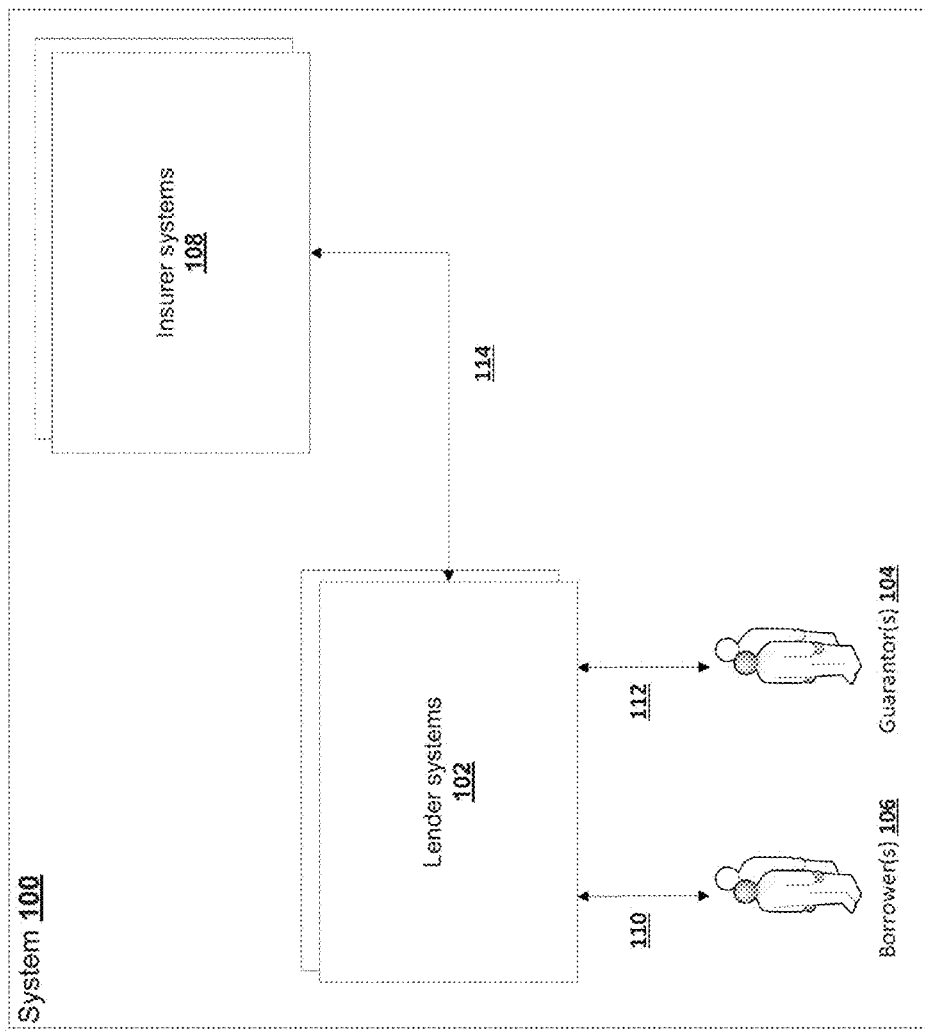
FIG. 1, according to some aspects of the invention, is a schematic diagram illustrating basic aspects of a system that may be suitable for implementation of various aspects of the disclosure.

Referring now to FIG. 1, a schematic diagram illustrating basic aspects of a system that may be suitable for implementation of various aspects of the disclosure.

FIG. 1 provides a very simple implementation of a system 100, according to some embodiments of the invention. Those skilled in the relevant arts may understand that the system 100 may be implemented with non-technological means, or, with special advantage on suitably-configured signal and/or other data processing systems. To facilitate present discussion, a simplified embodiment of a credit and investment deposit or other system 100 suitable for use in implementing wealth transfer processes is shown in FIG. 1.

The system 100 comprises one or more lender systems 102, one or more borrowers 106, one or more guarantors 104 and one or more insurer systems 108. The one or more borrowers 106 may access the one or more lender systems 102 through link 110. The one or more guarantors 104 may access the one or more lender systems 102 through link 112.

The one or more insurer systems 108 may not be present in some embodiments of the invention. For example, in jurisdictions where there is no mandatory mortgage insurance required, the one or more lenders may be able to lend directly to the one or more borrowers without the inclusion of the one or more insurers as long as adequate security/collateral against the mortgage is provided.

The one or more lender systems 102 may include, for example, institutions which operate to lend money to the one or more borrowers 106, the borrowing possibly guaranteed by the one or more guarantors 104. The one or more lender systems 102 may be connected to insurer systems 108, through link 114. In some embodiments of the invention, the one or more lender systems 102 may include systems operated by banks, credit unions, or any type of financial company.

The one or more borrowers 106, in some embodiments of the invention, may include individuals, organizations, or corporations seeking to borrow money to finance purchases. For example, the one or more borrowers 106 may include a young couple seeking to finance their purchase of their first home through a bank.

The one or more guarantors 104, in some embodiments of the invention, may include individuals, organizations, or corporations seeking to guarantee the loan of one or more borrowers 106. The guarantee may be in part or in full, and the one or more guarantors 104 may provide collateral to support the one or more borrowers 106. For example, the one or more guarantors 104 may include a father partially guaranteeing the mortgage taken by his young son and wife by providing $50,000 as collateral to the bank. The one or more guarantors 104 may also, in alternate embodiments of the invention, include third parties that lend money directly to the one or more borrowers 106 to provide money for an enhanced down payment on a home. For example, a third party lender may provide the young couple $50,000 for the young couple to provide as a down payment for their mortgage.

The one or more guarantors 104 may also include third parties who do not post collateral to the one or more lenders, but rather, provide a loan to the one or more borrowers 106 directly so that the one or more borrowers 106 may provide an enhanced down payment.

The duration of the guarantor's obligation may not necessarily be tied to the duration of the mortgage. For example, the mortgage may be structured in such a way that the one or more guarantor's collateral is released upon achieving a pre-determined condition by the one or more borrowers 106, such as a specific loan-to-value ratio.

The one or more insurer systems 108, in some embodiments of the invention, may include systems operated by organizations seeking to provide mortgage insurance to the one or more lenders. The one or more lenders may pay mortgage insurance premiums to the one or more insurance organizations, and in the event of a default on the mortgage, the one or more insurance organizations may be required to provide financial compensation to the one or more lenders. In certain jurisdictions, such as Canada, mortgage insurance is mandatory on loans beyond a certain loan-to-value ratio, and raises the overall cost of borrowing for the one or more borrowers 106.

The link 110 between the one or more lender systems 102 and the one or more borrowers 106 may be comprised of a variety of different means, technological and non-technological. For example, in some embodiments of the invention, the one or more borrowers 106 may be able to interact directly with a customer service agent operating as part of the one or more lender systems 102. In other embodiments of the invention, the one or more borrowers 106 or the customer service agent may be able to interact through a graphical user interface (GUI) as part of the one or more lender systems 102. In yet other embodiments of the invention, the one or more borrowers 106 may be able to interact with the one or more lender systems 102 through a web interface, an application programmable interface (API), electronic mail or similar technological communication means.

Similarly, the link 112 between the one or more lender systems 102 and the one or more guarantors 104 may be comprised of a variety of different means, technological and non-technological. For example, in some embodiments of the invention, the one or more guarantors 104 may be able to interact directly with a customer service agent operating as part of the one or more lender systems 102. In other embodiments of the invention, the one or more guarantors 104 or the customer service agent may be able to interact through a graphical user interface (GUI) as part of the one or more lender systems 102. In yet other embodiments of the invention, the one or more guarantors 104 may be able to interact with the one or more lender systems 102 through a web interface, an application programmable interface (API), electronic mail or similar technological communication means.

The links 110 and 112 may be one and the same, or separate, depending on the embodiment of the invention. For example, it may be advantageous to have communications between the one or more lender systems 102 and the one or more guarantors 104 separate from the communications between the one or more lender systems 102 and the one or more borrowers 106. For example, the one or more guarantors 104 may have different interests than the one or more borrowers 106, and separate interfaces may better facilitate their decision making processes.

The link 114 between the one or more lender systems 102 and the one or more insurer systems 108 may be comprised of a variety of different means, technological and non-technological. For example, in some embodiments of the invention, the one or more insurer systems 108 may be able to interact directly with a customer service agent operating as part of the one or more lender systems 102. In other embodiments of the invention, the one or more insurer systems 108 or the customer service agent may be able to interact through a graphical user interface (GUI) as part of the one or more lender systems 102. In yet other embodiments of the invention, the one or more insurer systems 108 may be able to interact with the one or more lender systems 102 through a web interface, an application programmable interface (API), electronic mail or similar technological communication means.

An advantage of utilizing a set of APIs or GUIs is the ability to obtain real or near-real time insurance premiums or quotes and prices on the one or more guarantors' collateral. As noted in example described above, it is potentially advantageous to some parties involved to utilize current information in making decisions, as the decisions may be more readily responsive to changes in pricing or in the market.

Potential advantages to implementing guarantor loans include reducing or eliminating mortgage premiums payable throughout the course of the mortgage, as the amount of risk taken on by a lender is a significant factor in determining mortgage premiums.

Further, the collateral provided by the one or more guarantors 106 may further reduce the need for the one or more lenders to obtain mortgage insurance to insure the mortgage against default. This reduced need for obtaining mortgage insurance may result in lower mortgage payments for the one or more borrowers 104.

In certain jurisdictions, government rules may require the mandatory purchase of mortgage insurance for mortgages whose loan-to-value (LOAN-TO-VALUE) ratios are above a certain percentage. For example, in Canada, the one or more lenders may not lend the one or more borrowers 106 a sum of money greater than 80% of the value of a residential property unless the mortgage is insured against default. In this example, the one or more borrowers 106 will, as a result, pay for this insurance through higher mortgage premiums.

The posting of collateral by the one or more guarantors 104, may, individually or in conjunction with the down payment provided by the one or more borrowers 106, provide enough equity, such that the loan-to-value ratio is improved. An improved loan-to-value ratio may result in a reduction or the elimination of mortgage insurance premiums. Further, the increased equity may enable the one or more borrowers 106 to purchase an asset that the one or more borrowers 106 would otherwise not be able to financially afford to purchase.

Collateral provided by the one or more guarantors 104 may be of any type or form, and of any value suitable for use in implementing the processes and objectives described herein, including, for example, to reduce both risk to, or exposure of, one or more of lender, in case of default or other failure in a loan process. For example, collateral provided by the one or more guarantors 104 may include, but is not limited to, cash, stocks, bonds, insurance policies, equity in properties, or any other types of assets.

The collateral from the one or more guarantors 106 posted to the one or more lenders may be held in various accounts, for example, and not limited to, GICs, high interest savings accounts, registered accounts or investment accounts.

The disclosure herein provides improvements to devices and processes useful in the implementation of guarantor loans, including especially aspects involving the transfer of wealth in any forms, and in such loans themselves.

In some embodiments of the invention, collateral provided by the one or more guarantors 104 may be held until one or more specified conditions are satisfied, and then returned to the guarantors 104. Such conditions may, for example, include passage of a period or periods of time; lender metrics (such as risk metrics, forecasting models, decision processes, location and other property attributes, third party predictive models), repayment of specified amount(s) of loaned capital, and/or interest accrued thereon; and/or change to of one or more ratios of repaid principal (sometimes referred to as 'equity') to total and/or unpaid loan balance(s), including, for example, various forms of loan-to-value (LOAN-TO-VALUE) ratios. In some embodiments, returned collateral may include interest and/or other benefits paid and/or otherwise provided by the one or more lenders and/or others during the period when the collateral was held by the one or more lenders, for example directly and/or through any lender's' agents.

A potential advantage of applying different conditions for satisfaction is the ability for the one or more lenders to manage risk. For example, it may be found that the risk of default decreases substantially after 5 years, and the one or more lenders may wish to postpone any collateral releases until after this period has elapsed.

In some embodiments of the invention, the one or more guarantors 104 may be held liable to the one or more lenders only, for example, to the limit of any collateral provided by the one or more guarantors 104, and/or only until such time as such collateral has been released back to the guarantor(s) and/or until conditions such as those described above for such release have been satisfied.

In some embodiments of the invention, the reliability, efficiency, and effectiveness of payment, monitoring, administrative, and other processes can be improved significantly through the use of suitably configured signal and/or data processing systems, as discussed below.

In some embodiments of the invention, one or more mortgage insurers may be assigned a first right to collateral in the event of any default, or pre-defined type(s) of default.

The system 100 may be implemented, for example, in the form of local and/or wide-area networked signal communication systems, using infrastructure available through communication systems such as the internet and one or more suitably-configured local and/or wide-area networks.

Signals suitable for interpretation by the various systems 102 and 108 may be communicated therebetween, and can represent forms or other data set(s) suitable for use in loan application, implementation, and administration processes, through the use of, for example, suitably-configured interactive graphical user interfaces (GUIs) adapted to elicit and read input of necessary and/or otherwise desired input parameters, such as any suitably-configured identification (ID) information associated with any one or more individuals or groups of lender(s), guarantor(s), borrower(s), insurer(s); loan, payment; interest, collateral, and other amount(s), represented in any suitable currencies or other financial media; and applicable LOAN-TO-VALUE ratios, thresholds, etc., as will apparent throughout the following.

In some embodiments of the invention, communications between each of the systems may be conducted through the use of application programming interfaces (APIs), established for communications between various systems.

For example, the one or more lender systems 102 may communicate with the one or more third-party insurer systems 108 such that information could be dynamically pulled from the one or more third-party insurer systems 108.

In accordance with this example, one or more lender systems 102 may wish to query one or more insurer systems 108 to determine mortgage insurance premiums associated with different amounts of collateral posted either by the one or more borrowers or the one or more guarantors, individually or in conjunction for a mortgage that will amortize in 25-years. The third party insurer system 108 may then for example provide a rate of 2.00% for loan-to-value ratios of 85.01%-90%, and a rate of 2.75% for loan-to-value values of 90.01%-95%. The one or more borrowers and the one or more guarantors may then utilize this information to aid in their decisions of whether to take out a mortgage, and/or how much collateral they should provide to the lender in connection with a borrower's mortgage request.

The one or more lender systems 102 may generate suitably-configured loan data sets, comprising for example each of the unique data items described above, and storing them in suitable electronic form, including for example in secure persistent or non-volatile memory associated with and accessible by the one or more lenders. Some or all of such data may be accessible by any authorized parties, including for example administrators or other individuals associated with the one or more lenders, the one or more borrowers 106, the one or more guarantors 104, and one or more insurers.

Figure 2:
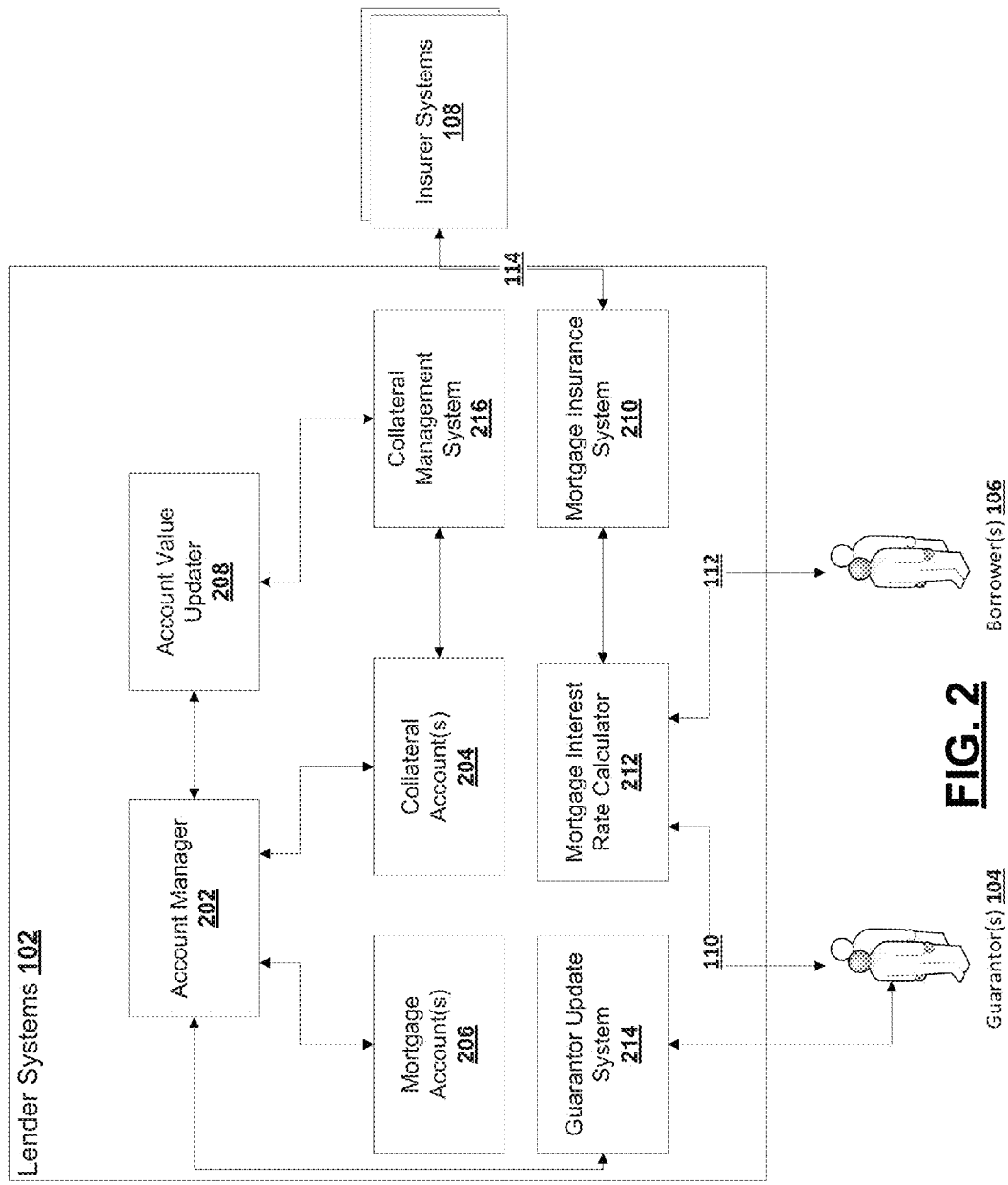
FIG. 2, according to some embodiments of the invention, is a schematic diagram showing the lender(s) system(s) in more detail.

Referring now to FIG. 2, a schematic diagram illustrating the one or more lender systems 102 in more detail, according to some embodiments of the invention. This example of the one or more lender systems 102 is provided as a non-limiting example, a skilled reader would understand that other embodiments exist that may or may not include all elements provided in FIG. 2, or may perhaps include other elements not provided in FIG. 2.

The one or more lender systems 102 may comprise an account manager system 202, an account value updater system 208, a guarantor update system 214, a collateral management system 216, a mortgage interest rate/insurance premium calculator 212, and a mortgage insurance system 210.

The account manager system 202 may administer one or more collateral accounts 204, as well as one or more mortgage accounts 206. The account manager system 202 may debit or credit the accounts accordingly, as time progresses and various events occur related to the mortgage.

The one or more collateral accounts 204 may hold the value of the collateral provided to the one or more lenders. The value in held collateral accounts may be fixed, variable, increasing or decreasing over time, according to various embodiments of the invention. For example, the one or more collateral accounts 204 may increase in value if the collateral is held in appreciating or interest-bearing assets. In some embodiments, the one or more collateral accounts 204 may dynamically decrease in value if the mortgage is structured in such a way that collateral is released upon certain conditions being met.

The one or more mortgage accounts 206 may hold the value of the outstanding mortgage, including principal and outstanding interest.

The account value updater system 208 is configured to update the account manager system 202 depending on the present state of the mortgage. The account value updater system 208 may also keep track of the conditions at which the collateral may be released to the one or more guarantors 104 or a pay out is required to be made to the one or more guarantors 104. For example, a pay out may be triggered after the mortgage has a loan-to-value ratio of 75%.

The account value updater system 208, in some embodiments of the invention, is configured to be able to keep track of the present state of the mortgage where the mortgagor makes accelerated or lump-sum payments. The accelerated or lump-sum payments to the one or more lenders may trigger a condition requiring a full or partial release of collateral, or a payment to be made to the one or more guarantors 104.

The mortgage interest rate/insurance premium calculator 212 is configured to calculate and provide options for mortgages with various combinations of collateral amounts, downpayment values, amortization periods, mortgage types, mortgage options (such as acceleration, variable and fixed interest rates, etc.) and other loan characteristics. The mortgage interest rate/insurance premium calculator 212 may be linked to the mortgage insurance system 210. The mortgage insurance system 210 may be linked to the one or more insurer systems 108 through link 114.

The mortgage interest rate/insurance premium calculator 212 may interface with the one or more guarantors 104 through the link 110 and with the one or more borrowers 106 through the link 112. This interface may be provided through various technological and non-technological means. Non-limiting examples of non-technological means may include through the interaction of customer service agents. Non-limiting examples of technological means may include the use of GUIs and APIs to improve the efficacy and the functionality of the process.

The mortgage interest rate/insurance premium calculator 212 may, in some embodiments of the invention, first require an number of inputs from the one or more guarantors 104 and the one or more borrowers 106, and then provide a number of options by calculating, through applying a set of rules, a set of mortgage rates given various characteristics of different potential mortgages. As an illustrative, non-limiting example of the use of the mortgage interest rate/insurance premium calculator 212, a guarantor and a borrower may provide their information and request quotes for a mortgage to purchase an asset worth $260,000. The guarantor and borrower, in this example, may wish to explore their options and they input ranges of collateral and down payments, and amortization schedules that they would consider providing the lender. The mortgage interest rate/insurance premium calculator 212, connects with the mortgage insurance system 210, if necessary, analyzes the information by applying a set of rules established by the lender and provides a table listing or other data representation of potential mortgage insurance premiums based upon different combinations of collateral, amortization schedules and down payment. Upon selection of a mortgage, the system 100 may then implement a mortgage with the specified characteristics.

Using suitably-configured machine-executable instructions, the one or more lenders and/or any authorized agents can thereafter implement the loans by writing or otherwise providing to suitably-configured borrower accounts any signals required to advance the funds, and at desired times, transfer funds for installment or other payments from such borrower accounts to designated lender accounts, in repayment. Signals suitable for effecting and recording transfer of insurance payments can be generated and written to the one or more insurers 108 or other parties, and at suitable times signals representing return or collateral to the one or more guarantors 104 can be generated and written to suitable communications addresses; and loan and other data sets can be updated as appropriate. Such processes and data records can be fully or semi-automatically generated and otherwise processed.

In any such embodiments the one or more lenders may be authorized to make, and may thereafter manage, repayment of the collaterals directly to the one or more guarantors 104 or the one or more borrowers 106 over time, as for example using all or any desired or otherwise suitable portion of repaid principal subsequent to each installment of an installment loan. Such repayment of collateral may advantageously be implemented by the one or more lender systems 102 on an automatic or semi-automatic basis, using suitably configured repayment rate tables and/or associated computer system routines or algorithms embodied therein.

For example, a bank can manage repayment of a collateral to the co-borrower(s) over time. When the primary borrower(s) make a periodic, e.g., monthly, payment on an installment loan, included in the payment can be a whole or partial repayment of such down payment to the "guarantor(s)." All or some portion of such scheduled payments can be applied to reduce both the outstanding principal amount(s), and therefore any mortgaged amount(s), in accordance with a designated amortization schedule; and simultaneously or alternatively can release the collateral in accordance with the same or another amortization schedule.

The mortgage insurance system 210 can submit requests for quotes from the one or more insurer systems 108. These requests may provide information on the characteristics of proposed mortgages, which may include, but are not limited to, the name(s) of the one or more borrowers 106, the name(s) of the one or more guarantors 104, the name(s) of the one or more lenders, the mortgage value, the amount of down payment, the amount of collateral, whether the mortgage insurer will have the first right at seizing the collateral, and any other information that may be relevant. The quotes returned from the one or more insurer systems 108 may include, but are not limited to, specific mortgage insurance premiums for the options suggested, or a data set comprised of a set of mortgage insurance premium rates associated with different characteristics of potential mortgages.

In some embodiments of the invention, the mortgage insurance system 210 receives real or near-real time data feeds from the one or more insurer systems 108 and uses this information to provide the mortgage interest rate/insurance premium calculator 212 updated mortgage insurance premium data sets.

In some embodiments of the invention, the mortgage insurance system 210 receives time-limited quotes from the one or more insurer systems 108. In these time-limited quotes, the quotes may only be valid for acceptance within a particular duration of time.

The guarantor update system 214 may be configured to provide the one or more guarantors 104 updates regarding the state of obligations related to the mortgage. The updates may be periodic, upon request, and/or upon the occurrence of a particular event. In a non-limiting example, the one or more guarantors may wish that an update is provided every six months, and also upon any event which may impact his/her obligations regarding his/her collateral. In this example, the one or more guarantors may be providing with an update in the event of a potential default event, or if the loan-to-value condition has been met and the collateral may be released. The updates may be provided through technological or non-technological means, including but not limited to, email, telephone calls, letter mail, etc. The contents of the updates may provide various information related to the mortgage, such as, but not limited to, the duration of the mortgage, the current loan-to-value of the mortgage, the current value of the asset, the current value of equity, any acts of default, etc. The availability of such a notification service where the guarantor may monitor the progress of the release of the collateral that they have provided over time, can motivate the guarantor to provide the collateral amount, or to provide a larger collateral amount.

The collateral management system 216 may be configured to monitor collateral data and mortgage data from the guarantor mortgage to review the value of the collateral at various points in time during the duration of the guarantor mortgage. The collateral management system 216 may be further configured to provide updates to the account value updater 208.

According to some aspects of the invention, the collateral management system 216 may monitor on a periodic basis, or upon the triggering of an event, to review the value of the assets, including, but not limited to, reviewing whether the value of the assets has been impaired (if the value of the assets fluctuate) or if there have been any unauthorized withdrawals from the account.

According to some aspects of the invention, a collateral report may be generated to provide information related to the guarantor mortgage. This information may include, but is not limited to, the current loan-to-value of the mortgage, whether any default events have occurred, the eligibility of collateral for release and the value of collateral if it is held in an investment, the current status of the collateral (e.g. a security interest is still in force and not released).

This collateral report may be provided to a variety of different parties, such as, but not limited to, the one or more borrowers 106, the one or more guarantors 104, and the one or more mortgage insurers 108. In some aspects of the invention, the collateral report is automatically and periodically sent to the mortgage insurers through electronic means.

Figure 3:
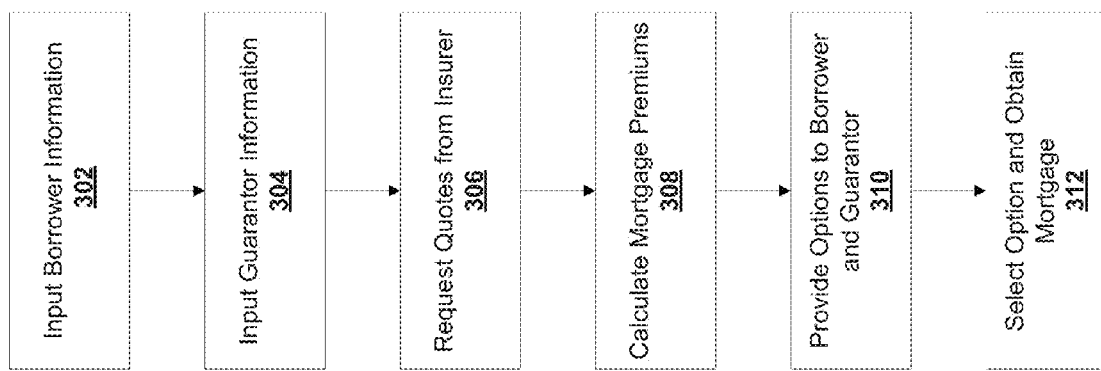
FIG. 3, according to some embodiments of the invention, provides a sample flowchart of a process to obtain a guarantor mortgage.

Referring now to FIG. 3, a sample flowchart of a process to obtain a guarantor mortgage is provided, according to some embodiments of the invention. FIG. 3 provides, for illustrative purposes, a non-limiting, simplified example of a process to establish a guarantor mortgage.

At step 302, the one or more borrowers 106 may provide information as to the mortgage desired, the type of asset being purchased by the mortgage, the amount of down payment, the desired amortization periods, the borrower's credit history, or any other information that may be relevant in the obtaining of a mortgage.

At step 304, the one or more guarantors 104 may provide information as to the amount of collateral to be provided, the type(s) of collateral to be provided, the guarantor's desired period of obligation (e.g. collateral maturity), how the guarantor wishes to be repaid the collateral (e.g. periodic pay outs, lump sum at collateral maturity), the types of assets that the lender should hold the collateral in (e.g. a collateral value of $50,000 is placed into GICs), the types of updates the one or more guarantors 104 wishes to receive or any other information that may be relevant in the obtaining of a mortgage.

At step 306, if applicable, mortgage insurance premium rates are requested from the one or more insurers 108. As noted above, these mortgage insurance premium rates may be mandatory depending on the particular characteristics of the desired mortgage. In a non-limiting example, a mortgage with a loan-to-value of 95% may require a mortgage insurance premium of 2.0%. The mortgage insurance premiums may fluctuate over time.

At step 308, mortgage interest rates are calculated for a number of options for mortgages with various characteristics. These interest rates are calculated by the one or more lender systems 102 through the application of rules to the particular data sets in conjunction with information captured by the one or more lender systems 102 in steps 302, 304 and 306.

At step 310, the various options are provided to the one or more borrowers 106 and the one or more guarantors 104. The one or more borrowers 106 and the one or more guarantors 104 may choose to accept or reject the options provided to them.

According to some embodiments, there may be additional decision support features provided to help the one or more guarantors 104 and/or the one or more borrowers 106 select a guarantor mortgage. For example, these decision support features may include diagrams indicating various interest rates available, the projected loan-to-value ratios over time, modelling based upon interest rates and expected value growth, etc.

At step 312, the one or more borrowers 106 and the one or more guarantors 104 accept one of the options provided to them and the one or more lender systems 102 implements a mortgage with the specified characteristics.

Figure 3B:
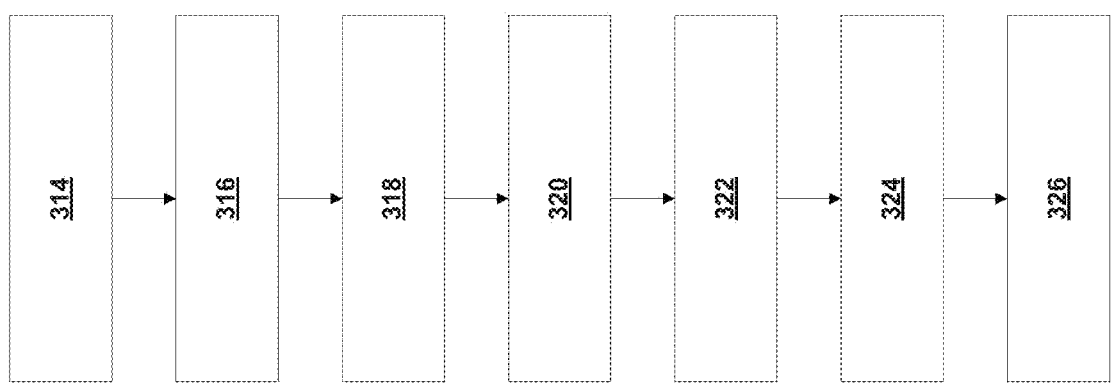
FIG. 3B, according to some embodiments of the invention, provides a sample flowchart of a process to obtain a guarantor mortgage and to monitor the guarantor mortgage as collateral is released.

Referring now to FIG. 3B, a sample flowchart of a process for obtaining a guarantor mortgage and monitoring the guarantor mortgage as collateral is released, according to one aspect of the invention. While this aspect of the invention includes obtaining mortgage insurance premium information, there are aspects of the invention where it is not necessary to obtain mortgage insurance premium information.

At step 314, the one or more lender systems 102 provide information from the one or more borrowers 106 and the one or more guarantors 104 to the one or more insurer systems 108.

At step 316, based upon the information received, the insurer systems 108 calculate one or more sets of mortgage insurance premium information. The mortgage insurance premium information may, for example, be expressed as a percentage of loan value and/or periodic mortgage insurance premium payment (the mortgage insurance premium may, in some aspects of the invention, be added on to the mortgage interest/mortgage payment amount by the lender).

At step 318, the mortgage insurance premium information is presented to the one or more borrowers 106 and/or the one or more guarantors 104 in order to inform the selection of a collateral amount, and based on this corresponding mortgage repayment information and corresponding mortgage insurance premium information.

Different options may be presented to the one or more borrowers 106 and the one or more borrowers 104. It is desirable that the one or more borrowers 106 and the one or more borrowers 104 are provided with information to support their decisions.

A potential advantage of increased decision support is the increased motivation and comfort in providing collateral. For example, in one aspect of the invention, the system 100 may be configured to generate information to illustrate the release of the collateral over time, and the guarantor may be able to vary the collateral amount based on what the one or more guarantors believe the borrower can afford or should be able to afford.

At step 320, information regarding selection is submitted to the system 100, and the entry into a mortgage insurance contract is initiated. According to some aspects of the invention, the mortgage can then be provided into a processing with investment info to flag the mortgage for collateral management.

At step 322, both mortgage repayment information and mortgage insurance premium information may be used to set up the collateral account; this may include applying a security interest to the one or more assets provided as collateral, based on the mortgage insurance contract.

According to some aspects of the invention, where the collateral provided is in an account with the lender, the collateral may be registered against that account and that account may be flagged or restricted to ensure that there are no unauthorized withdrawals while the account is being held as collateral for a related guarantor mortgage.

At step 324, collateral may be locked down in part based on the mortgage insurance contract; the lender system 200 may establish a security interest in the collateral in favour of the mortgage insurer based on the applicable mortgage insurance contract.

At step 326, the security interest of the mortgage insurer may be released over a period of time (as in other cases). As a non-limiting example for illustration, the security interest may be released over a period of time as the loan-to-value ratio reaches certain milestone thresholds and after at least three years has passed.

Releasing collateral may be conducted as a full release, or a partial release. In various embodiments of the invention, release collateral may, for example, include discharging one or more security interests, releasing funds to a third-party borrower, physically returning one or more assets, removing liens, unlocking locked bank accounts that is holding assets held as collateral, removing restrictions on sale, etc.

Releasing collateral may also, in some embodiments, include the release or payment of any interest accrued on an asset. In these situations, the system may calculate one or more interest payments payable for the one or more assets. Further, the releasing of collateral may further include the re-investment of the assets.

Figure 4:
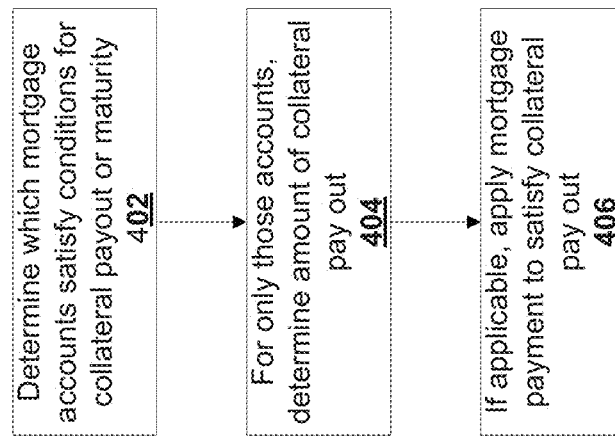
FIG. 4, according to some embodiments of the invention, provides a sample flowchart of a process to provide payouts of the collateral.

Referring now to FIG. 4, a sample flowchart of a process to partially release collateral is provided, according to some embodiments of the invention. At step 402, the system 100 selects which mortgage accounts satisfy conditions for collateral pay out. As a non-limiting example, where collateral has been posted for a $260,000 mortgage and one or more guarantors 104 has structured his/her guarantee in such a way that collateral is incrementally released upon achieving loan-to-value milestones, when a loan-to-value milestone is reached, the condition is met for a pay out of part of collateral. Step 402 may occur periodically, or be triggered through the occurrence of an event.

At step 404, for only the accounts that are identified for a pay out are updated to determine the amount of pay out.

At step 406, the one or more guarantors 104 may receive a pay out representing the part of the collateral to be released. The value held in the collateral account is updated to reflect this change.

In some embodiments of the invention, the pay out may be linked to the mortgage payments received by the one or more lenders from the one or more borrowers 106.

Figure 5:
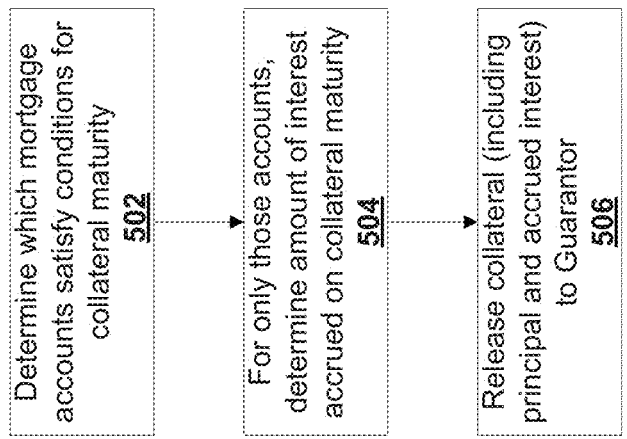
FIG. 5, according to some embodiments of the invention, provides a sample flowchart of a process to release collateral at collateral maturity.

Referring now to FIG. 5, a sample flowchart of a process to release collateral upon collateral maturity is provided, according to some embodiments of the invention. At step 502, the system 100 selects which mortgage accounts satisfy conditions for collateral maturity. As a non-limiting example, where collateral has been posted for a $260,000 mortgage and one or more guarantors 104 has structured his/her guarantee in such a way that collateral is fully released upon achieving a specific loan-to-value ratio, when that loan-to-value ratio is reached, the condition is met for the release of all the collateral as a lump sum. Step 502 may occur periodically, or be triggered through the occurrence of an event.

At step 504, for only the accounts that are identified for collateral maturity are updated to determine the amount to be paid out/released. As a non-limiting example, the collateral may be held in an interest-bearing GIC. The amount to be paid out/released may include interest in addition to the original principal amount.

At step 506, the one or more guarantors 104 may receive a pay out representing the collateral being released at collateral maturity.

Figure 6:
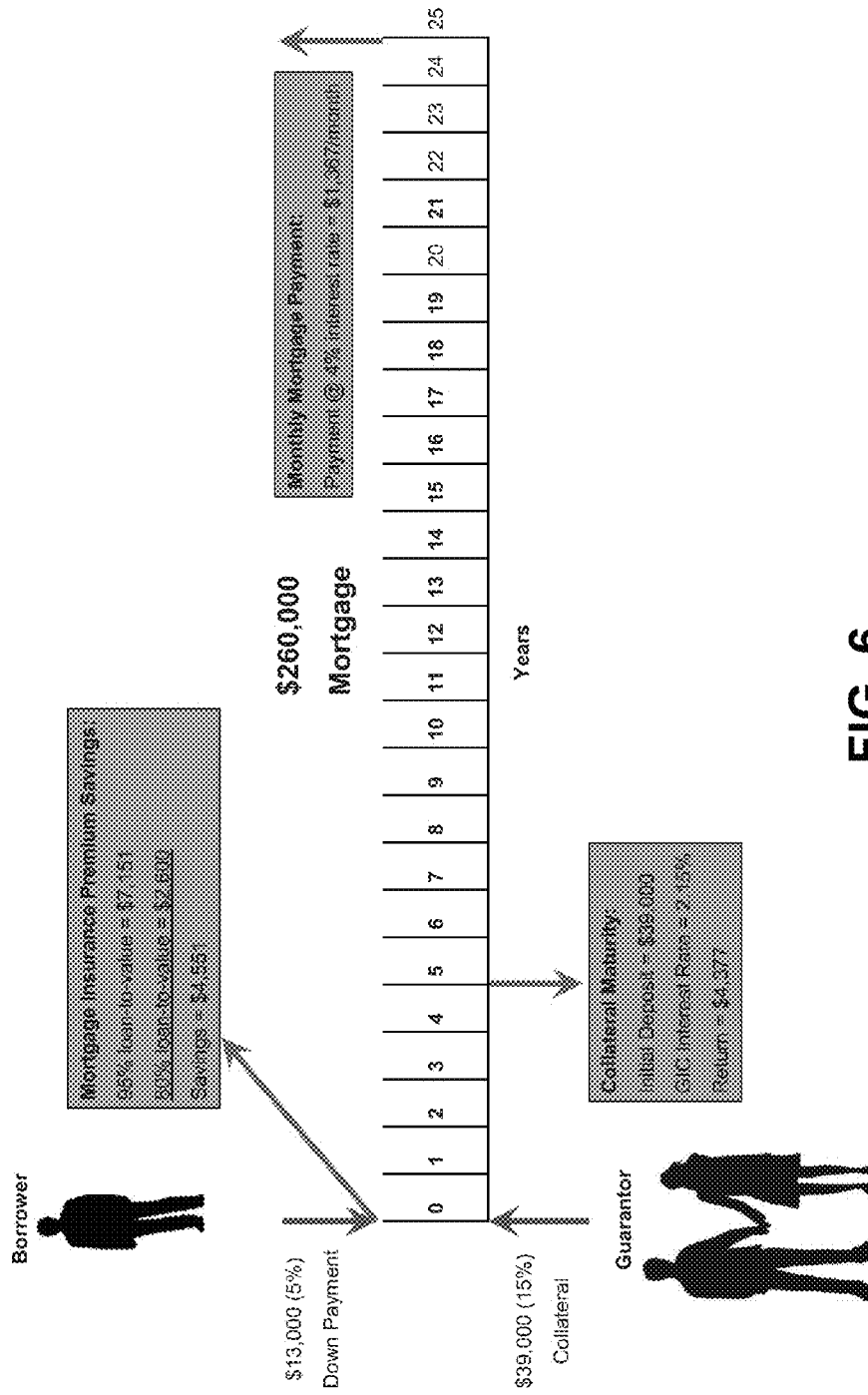
FIG. 6, according to some embodiments of the invention, illustrates an example mortgage situation where the value of the mortgage is $260,000, the borrower provides a down payment of 5% of the value of the mortgage and the guarantor provides collateral valued at 15% of the value of the mortgage. In this example mortgage situation, the collateral is placed into guaranteed investment certificates (GICs).

Referring now to FIG. 6, FIG. 6 illustrates an example mortgage situation, where the value of the mortgage is $260,000, the borrower provides a down payment of 5% of the value of the mortgage and the guarantor provides collateral valued at 15% of the value of the mortgage, according to some embodiments of the invention. In this example mortgage situation, the collateral is placed into guaranteed investment certificates (GICs) and is returned to the one or more guarantors 104 at collateral maturity, which occurs at 5 years. As indicated, at collateral maturity, the collateral now includes interest in addition to the principal amount of $39,000.

Figure 7:
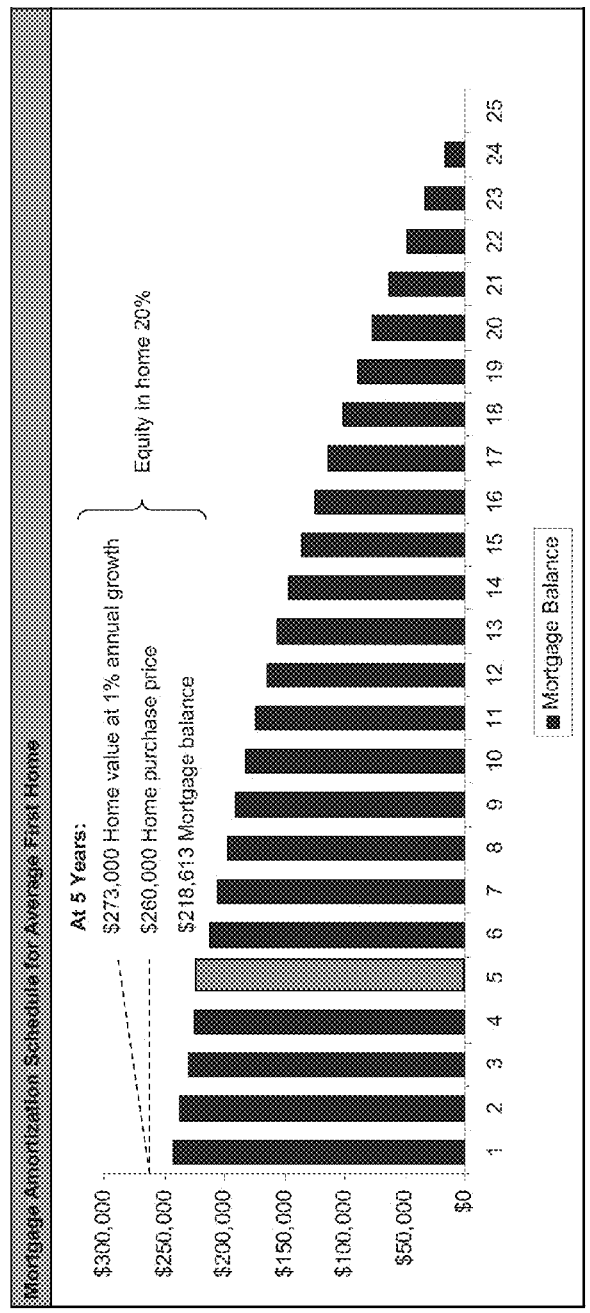
FIG. 7, according to some embodiments of the invention, illustrates an example mortgage amortization schedule for an average first home by plotting the mortgage balance against time (measured in years).

Referring now to FIG. 7, FIG. 7 illustrates an example mortgage amortization schedule for an average first home by plotting the mortgage balance against time (measured in years), according to some embodiments of the invention. As illustrated in this example, the loan-to-value ratio of a mortgage may also vary depending on external factors, such as the value of the asset in the market. In this example, the home value is estimated to grow at 1% annually.

Referring now to FIG. 8, FIG. 8 illustrates an example mortgage model where, in contrast to a standard high loan-to-value ratio mortgage, the guarantor(s) provides enough of a deposit such that mortgage insurance premiums are unnecessary, according to some embodiments of the invention.

Figure 9:
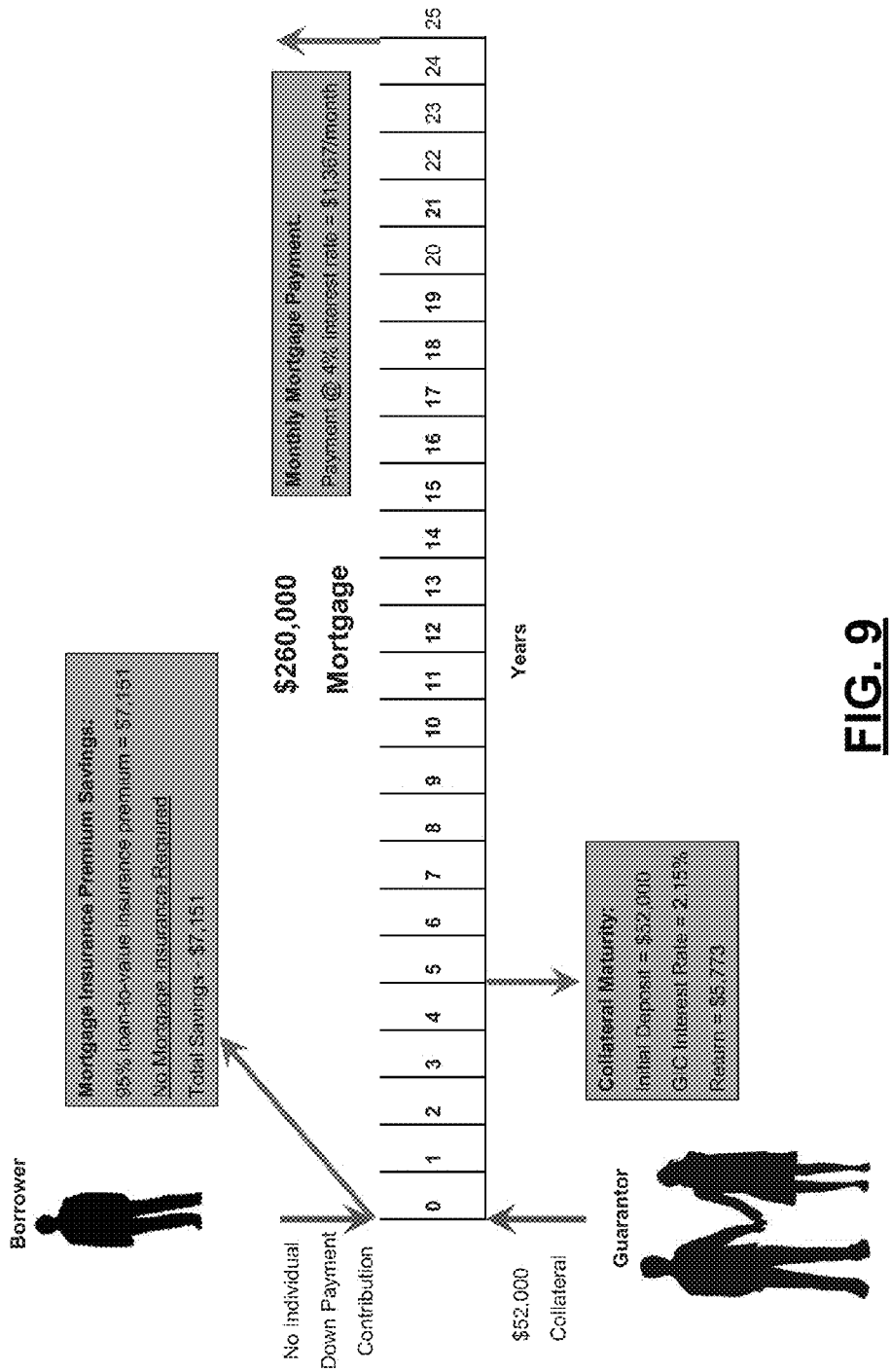
FIG. 9, according to some embodiments of the invention, illustrates an example mortgage situation where the value of the mortgage is $260,000, the borrower(s) provides no down payment, and the guarantor(s) provides 20% of the value of the mortgage in collateral(s).

Referring now to FIG. 9, FIG. 9 illustrates an example mortgage situation where the value of the mortgage is $260,000, the borrower(s) provides no down payment, and the guarantor(s) provides 20% of the value of the mortgage in collateral(s), according to some embodiments of the invention.

Referring now to FIG. 10, FIG. 10 according to some embodiments of the invention, illustrates an example mortgage model where, in contrast to a standard high loan-to-value ratio mortgage, the one or more guarantors 104 lends funds to the one or more borrowers 106 whereby the bank manages the repayment of the loan to the one or more guarantors 104 over time. In this example, when the one or more borrowers 106 makes their monthly mortgage payments, included in the payment will be a loan repayment (potentially including interest) to the one or more guarantors 104. The one or more guarantors 104, in this example, provide funds directly to one or more borrowers 106 to provide the down payment, as opposed to providing collateral to the one or more lenders.

Figure 11:
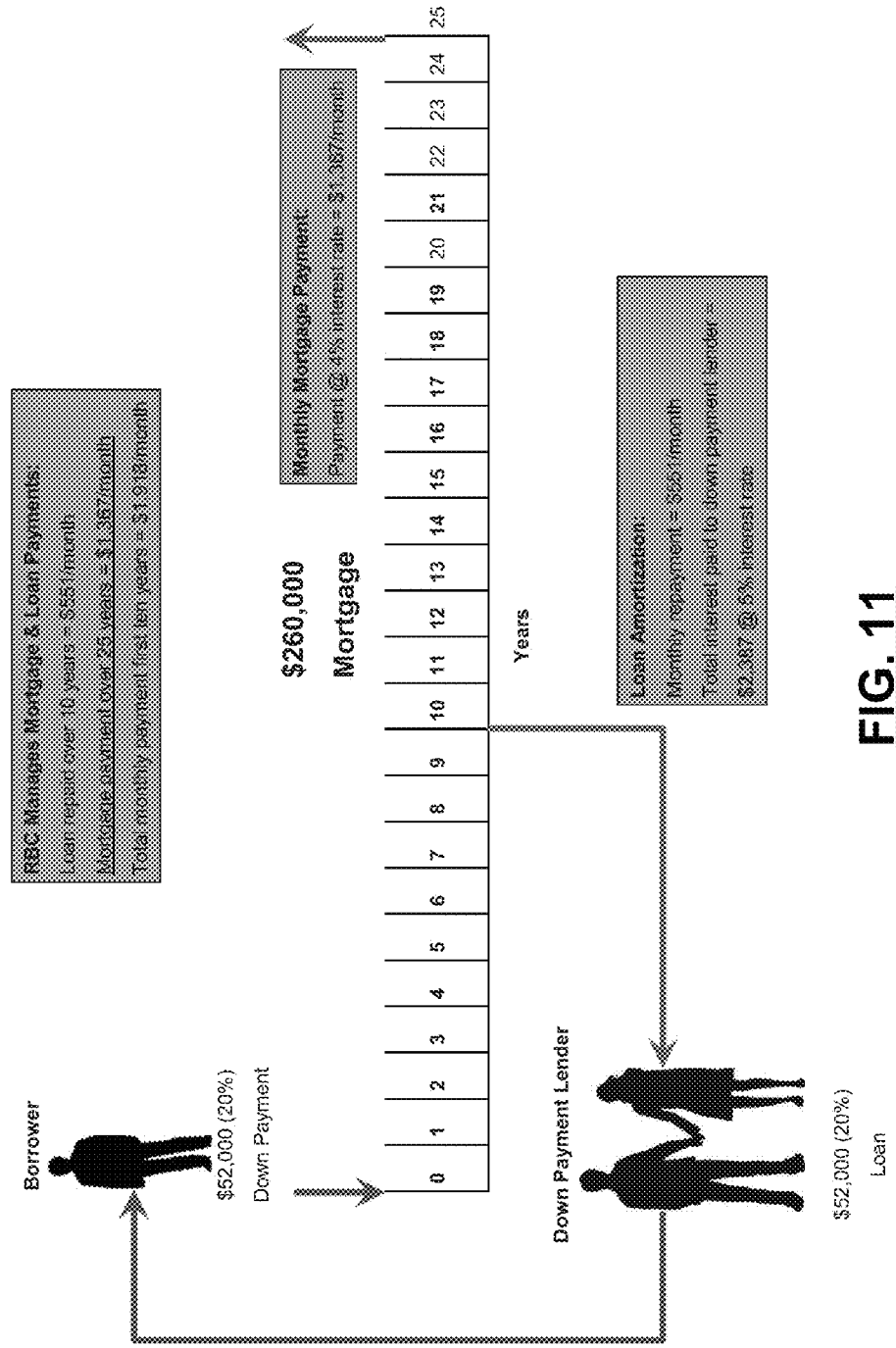
FIG. 11, according to some embodiments of the invention, illustrates an example mortgage situation where the value of the mortgage is $260,000, the borrower(s) provides a down payment of 20% of the value of the mortgage, wherein the down payment is provided to the borrower by a down payment lender(s).

Referring now to FIG. 11, FIG. 11 illustrates an example mortgage situation where the value of the mortgage is $260,000, the borrower(s) provides a down payment of 20% of the value of the mortgage, wherein the down payment is provided to the borrower by a down payment lender(s), according to some embodiments of the invention. The one or more guarantors 104, ("Down Payment Lenders") in this example, provide funds directly to one or more borrowers 106 to provide the down payment, as opposed to providing collateral to the one or more lenders.

Referring to FIG. 12, FIG. 12, according to some embodiments of the invention, provides potential variations on the mortgage models, including but not limited to, percentages that will be put up as collateral, types of account collateral may be held in, types of collateral(s) that may be used, interest rates/incentives paid to guarantors or individual lenders, characteristics of collateral repayment (frequency, time, amount), characteristics of potential guarantors or lenders, and the number of guarantors/lenders that may participate.

As will be appreciated by those skilled in the relevant arts, among other advantages offered by the invention is that it may be implemented, with significant advantage, in machine-executable versions such as computer-implemented processes for processing suitably-encoded signals representing instructions and data, to rapidly, accurately, and efficiently set up loans and/or automate all or any portion(s) of payment, monitoring, administration, and repayment thereof. Variables such as those described above and in FIG. 12 may be employed in such processes by encoding machine-readable and storable signals to represent values associated with such variables in specific cases, and thereafter using them in applying suitably-coded logic rules.

Figure 13:
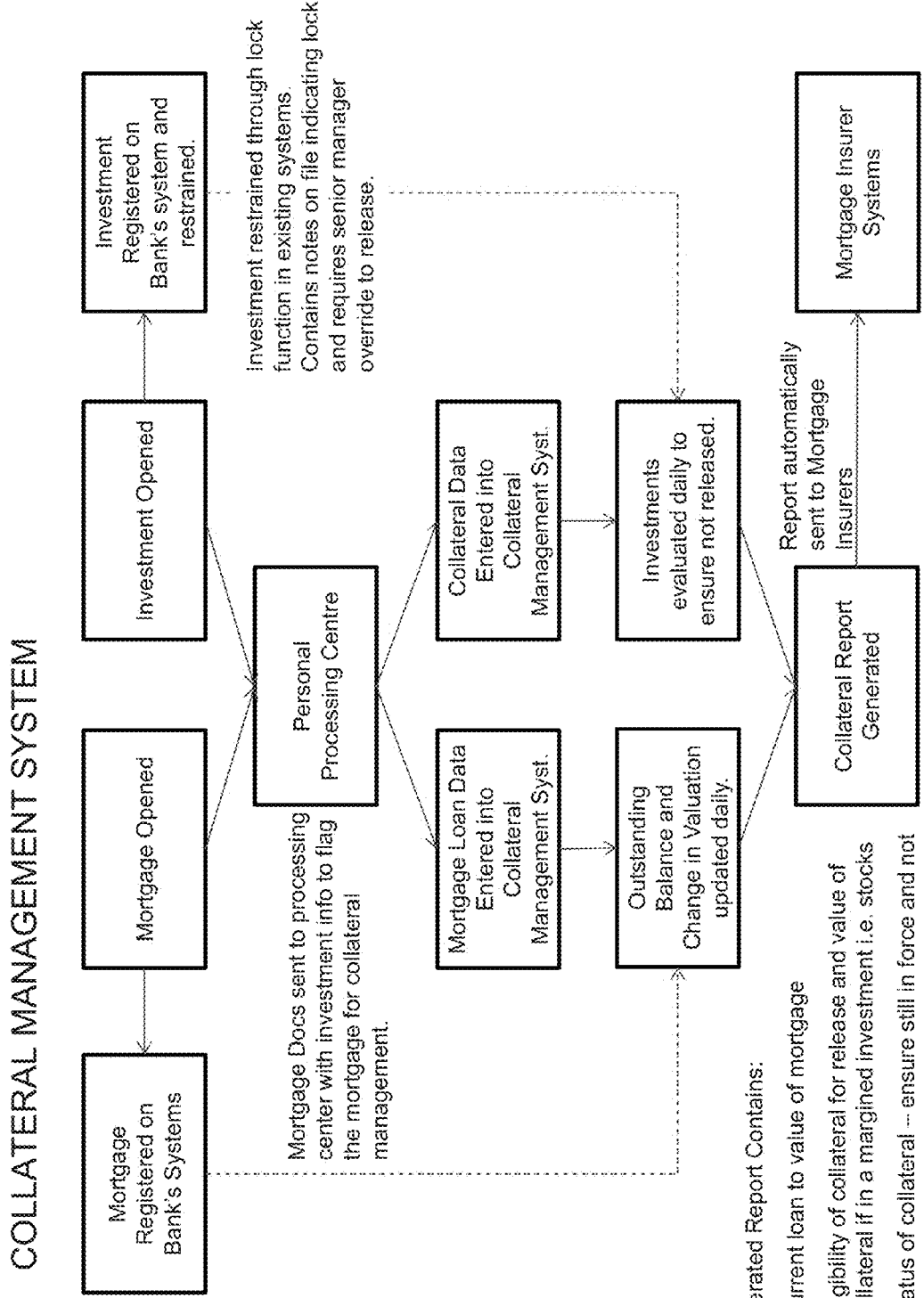
FIG. 13, according to some embodiments of the invention, provides a sample flowchart illustrating a collateral management system.

Referring to FIG. 13, FIG. 13 provides a sample flowchart illustrating a collateral management system 216, according to some embodiments of the invention. In the example provided, the collateral management system 216 monitors the valuations of the mortgage loan data and the collateral data on a periodic basis. The collateral management system 216, in this example, creates a collateral report that is generated and sent automatically to one or more mortgage insurers 108. The example also provides for the scenario where the collateral is an investment registered on a lender's system; the investment can be restrained through locking functions to ensure that the collateral is not released without proper authorization.

Data processes used in implementing such embodiments of the disclosure can use any programming or other instruction schemes (including high- and/or low-level programming languages) and data structures consistent with the purposes disclosed or suggested herein.

While the disclosure has been provided and illustrated in connection with specific, presently-preferred embodiments, many variations and modifications may be made without departing from the spirit and scope of the invention(s) disclosed herein. The disclosure and invention(s) are therefore not to be limited to the exact components or details of methodology or construction set forth above. Except to the extent necessary or inherent in the processes themselves, no particular order to steps or stages of methods or processes described in this disclosure, including the Figures, is intended or implied. In many cases the order of process steps may be varied without changing the purpose, effect, or import of the methods described. The scope of the invention is to be defined solely by the appended claims, giving due consideration to the doctrine of equivalents and related doctrines.

What is claimed is:

1. A computer-implemented method for displaying electronic information relating to a guarantor mortgage performed by at least one data processor configured for executing machine-interpretable instructions, the method comprising:
    receiving one or more data sets providing borrower information relevant to a request for a mortgage loan;
    receiving one or more data sets providing information about one or more collateral amounts to be provided by one or more guarantors as collateral in connection with the request for a mortgage loan, wherein the collateral is supported by one or more assets;
    connecting, through an application programming interface, with one or more computing systems associated with mortgage insurance providers;
    receiving, from the one or more computing systems associated with the mortgage insurance providers, one or more data sets providing one or more mortgage insurance rates;
    processing instructions for execution of at least a portion of a data process executable by one or more networked computing resources, the data process including near real or real time calculation of one or more mortgage interest rates for a guarantor mortgage based upon the one or more data sets providing borrower information, the one or more data sets of the one or more mortgage insurance rates, and the one or more data sets providing information about the one or more assets to be provided as collateral;
    dynamically generating a decision-support interface receiving as inputs different combinations of collateral, downpayment, and amortization schedules, the decision-support interface, responsive to the inputs, displaying the one or more mortgage interest rates to the one or more borrowers and to the one or more guarantors;
    receiving from the one or more borrowers and the one or more guarantors computer signals representing a selection of a particular mortgage interest rate;
    automatically generating a schedule for repayment of the collateral from the one or more borrowers to the one or more guarantors, the schedule for repayment of collateral based at least on allocating a portion of a plurality of future mortgage payments to repay an overall value of the collateral over a term of the guarantor mortgage associated with the selected mortgage interest rate;
    providing, on the decision support interface, one or more projections of financial metrics modelled based at least on the schedule for repayment of the collateral and the selected mortgage interest rate, the one or more projections provided alongside a generated timeline illustrating release of the collateral over the term;
    processing instructions for establishing, on a lender computer system, one or more data parameters representing a guarantor mortgage based on (i) the selected mortgage interest rate, (ii) the one or more data sets providing borrower information, and (iii) the one or more data sets providing information about one or more assets to be provided as collateral;
    automatically generating and transmitting a security interest for registration against the collateral including at least a reference to a mortgage contract corresponding to the guarantor mortgage; and
    continuously monitoring event data for potential impairments relating to the collateral or default events relating to the guarantor mortgage over the term of the guarantor mortgage.

2. The method of claim 1, further comprising establishing one or more pre-determined conditions for the full or partial release of the collateral.

3. The method of claim 2, further comprising generating periodically or receiving periodically at least one of information regarding the repayment of the guarantor mortgage, and information regarding the value of one or more assets associated with the guarantor mortgage relative to an outstanding mortgage loan amount; and
    based on the at least one of the information regarding the repayment of the guarantor mortgage and the information regarding the value of one or more assets associated with the guarantor mortgage relative to an outstanding mortgage loan amount, when the one or more pre-determined conditions for the full or partial release of the collateral are satisfied, applying one or more rules to the guarantor mortgage for the full or the partial release of the collateral.

4. The method of claim 1, further comprising generating periodically or receiving periodically at least one of information regarding the repayment of the guarantor mortgage, and information regarding the value of one or more assets associated with the guarantor mortgage relative to an outstanding mortgage loan amount; and
    based on the at least one of the information regarding the repayment of the guarantor mortgage and the information regarding the value of one or more assets associated with the guarantor mortgage relative to an outstanding mortgage loan amount, when the one or more pre-determined conditions for the full or the partial release of the collateral are satisfied, applying one or more rules to the guarantor mortgage for the full or the partial release of the collateral.

5. The method of claim 1, further comprising sending the borrower information and the information about the one or more collateral amounts to one or more mortgage insurers and receiving one or more data sets containing mortgage insurance premium information.

6. The method of claim 5, wherein calculation, by the lender computer system, of the one or more mortgage interest rates is further based on the one or more data sets containing mortgage insurance premium information.

7. The method of claim 5, wherein the one or more data sets containing mortgage insurance information are received in real-time or near real-time through computer signals representing one or more mortgage insurance premium information in connection with the request for a mortgage loan.

8. The method of claim 5, wherein the one or more data sets containing mortgage insurance information include information on the duration for which one or more mortgage insurance premium rates are available for acceptance.

9. The method of claim 1, further comprising providing the one or more mortgage interest rates separately to each of the one or more guarantors and to each of the one or more borrowers.

10. The method of claim 1, wherein the one or more data sets providing borrower information includes at least one of one or more proposed mortgage principal amounts, one or more proposed amortization periods, one or more downpayment amounts, borrower identification, one or more proposed mortgage types, one or more proposed acceleration options, and borrower credit history.

11. The method of claim 1, wherein the one or more data sets providing information about the one or more assets to be provided as collateral includes at least one of one or more proposed collateral amounts, one or more proposed collateral types, one or more collateral obligation periods, proposed return on collateral, and one or more proposed collateral return conditions.

12. The method of claim 1, wherein processing the instructions for establishing, on the lender computer system, one or more data parameters representing the guarantor mortgage comprises establishing one or more accounts related to the guarantor mortgage and establishing one or more accounts related to the one or more assets provided as collateral by the one or more guarantors.

13. The method of claim 1, wherein processing the instructions for establishing, on the lender computer system, one or more data parameters representing the guarantor mortgage comprises establishing one or more accounts related to the guarantor mortgage and linking one or more pre-existing accounts related to the one or more assets to be provided as collateral by the one or more guarantors.

14. The method of claim 13, wherein linking one or more pre-existing accounts related to the one or more assets provided as collateral by the one or more guarantors to the mortgage includes locking the one or more pre-existing accounts related to the one or more assets provided as collateral by the one or more guarantors to prevent unauthorized release.

15. The method of claim 1, wherein processing the instructions for establishing, on the lender computer system, one or more data parameters representing the guarantor mortgage comprises establishing one or more security interests against the one or more assets provided as collateral.

16. The method of claim 2, wherein the one or more pre-determined conditions includes at least one of determining whether a duration of time has elapsed since the implementation of the mortgage, and determining whether the one or more mortgage accounts have a loan-to-value ratio above or below a pre-determined ratio.

17. The method of claim 3, wherein applying the one or more rules associated with the one or more pre-determined conditions includes at least one of partially or fully releasing assets held as collateral, unlocking a locked account holding assets held as collateral, discharging one or more security interests, and releasing funds to a third-party borrower.

18. The method of claim 1, further comprising monitoring the information regarding one or more assets associated with the guarantor mortgage relative to an outstanding mortgage loan amount to determine whether the value of the one or more assets provided as collateral has or has not been impaired.

19. The method of claim 1, further comprising monitoring the information regarding one or more assets associated with the guarantor mortgage relative to an outstanding mortgage loan amount to determine that the one or more assets associated with the guarantor mortgage relative to an outstanding mortgage loan amount have not been improperly released.

20. The method of claim 3, wherein applying the one or more rules for releasing the one or more assets comprises calculating one or more interest payments payable for the one or more assets.

21. The method of claim 3, wherein applying the one or more rules for releasing the one or more assets associated with the guarantor mortgage relative to an outstanding mortgage loan amount includes re-investing using the one or more assets associated with the guarantor mortgage.

22. The method of claim 1, further comprising generating a collateral report indicating at least one of the outstanding balance of the guarantor mortgage, the value of the one or more collateral associated with the guarantor mortgage, the current loan-to-value ratio of the guarantor mortgage, and whether any default events have occurred.

23. The method of claim 22, further comprising communicating the collateral report to the one or more mortgage insurers.

24. The method of claim 22, further comprising communicating the collateral report to the one or more guarantors.

25. A system for displaying electronic information relating to a guarantor mortgage, the system comprising at least one processor configured to execute machine-interpretable instructions and causing the system to:
receive one or more data sets providing borrower information relevant to a request for a mortgage loan;
receive one or more data sets providing information about one or more collateral amounts to be provided by one or more guarantors as collateral in connection with the request for a mortgage loan, wherein the collateral is supported by one or more assets;
connect, through an application programming interface, with one or more computing systems associated with mortgage insurance providers;
receive, from the one or more computing systems associated with the mortgage insurance providers, one or more data sets providing one or more mortgage insurance rates;

process instructions for execution of at least a portion of a data process executable by one or more networked computing resources, the data process including near real or real time calculation of one or more mortgage interest rates for a guarantor mortgage based upon the one or more data sets providing borrower information, the one or more data sets of the one or more mortgage insurance rates, and the one or more data sets providing information about the one or more assets to be provided as collateral;

dynamically generate a decision-support interface receiving as inputs different combinations of collateral, downpayment, and amortization schedules, the decision-support interface, responsive to the inputs, displaying the one or more mortgage interest rates to the one or more borrowers and to the one or more guarantors;

receive from the one or more borrowers and the one or more guarantors computer signals representing a selection of a particular mortgage interest rate;

automatically generate a schedule for repayment of the collateral from the one or more borrowers to the one or more guarantors, the schedule for repayment of collateral based at least on allocating a portion of a plurality of future mortgage payments to repay an overall value of the collateral over a term of the guarantor mortgage associated with the selected mortgage interest rate;

provide, on the decision support interface, one or more projections of financial metrics modelled based at least on the schedule for repayment of the collateral and the selected mortgage interest rate, the one or more projections provided alongside a generated timeline illustrating release of the collateral over the term;

process instructions for establishing, on a lender computer system, one or more data parameters representing a guarantor mortgage based on (i) the selected mortgage interest rate, (ii) the one or more data sets providing borrower information, and (iii) the one or more data sets providing information about one or more assets to be provided as collateral;

automatically generate and transmit a security interest for registration against the collateral including at least a reference to a mortgage contract corresponding to the guarantor mortgage; and continuously monitor event data for potential impairments relating to the collateral or default events relating to the guarantor mortgage over the term of the guarantor mortgage.

26. The system of claim 25, the at least one processor is further configured to establish one or more pre-determined conditions for the full or partial release of the collateral.

27. The system of claim 26, the at least one processor is further configured to generate periodically or receive periodically at least one of information regarding the repayment of the guarantor mortgage, and information regarding the value of one or more assets associated with the guarantor mortgage relative to an outstanding mortgage loan amount; and based on the at least one of the information regarding the repayment of the guarantor mortgage and the information regarding the value of one or more assets associated with the guarantor mortgage relative to an outstanding mortgage loan amount, when the one or more pre-determined conditions for the full or partial release of the collateral are satisfied, apply one or more rules to the guarantor mortgage for the full or the partial release of the collateral.

28. The system of claim 25, the at least one processor is further configured to send the borrower information and the information about the one or more collateral amounts to one or more mortgage insurers and receiving one or more data sets containing mortgage insurance premium information.

29. The system of claim 28, wherein calculation of the one or more mortgage interest rates is further based on the one or more data sets containing mortgage insurance premium information.

30. The system of claim 28, wherein the one or more data sets containing mortgage insurance information are received in real-time or near real-time through computer signals representing one or more mortgage insurance premium information in connection with the request for a mortgage loan.

31. The system of claim 28, wherein the one or more data sets containing mortgage insurance information include information on the duration for which one or more mortgage insurance premium rates are available for acceptance.

32. The system of claim 25, wherein the at least one processor is further configured to provide the one or more mortgage interest rates separately to each of the one or more guarantors and to each of the one or more borrowers.

33. The system of claim 25, wherein the one or more data sets providing borrower information includes at least one of one or more proposed mortgage principal amounts, one or more proposed amortization periods, one or more downpayment amounts, borrower identification, one or more proposed mortgage types, one or more proposed acceleration options, and borrower credit history.

34. The system of claim 25, the one or more data sets providing information about the one or more assets to be provided as collateral includes at least one of one or more proposed collateral amounts, one or more proposed collateral types, one or more collateral obligation periods, proposed return on collateral, and one or more proposed collateral return conditions.

35. The system of claim 25, the at least one processor is further configured to process the instructions for establishing, on the lender computer system, one or more data parameters representing the guarantor mortgage comprises causing the system to establish one or more accounts related to the guarantor mortgage and to establish one or more accounts related to the one or more assets provided as collateral by the one or more guarantors.

36. The system of claim 25, the at least one processor is further configured to process the instructions for establishing, on the lender computer system, one or more data parameters representing the guarantor mortgage comprises causing the system to establish one or more accounts related to the guarantor mortgage and to link one or more pre-existing accounts related to the one or more assets to be provided as collateral by the one or more guarantors.

37. The system of claim 36, wherein linking one or more pre-existing accounts related to the one or more assets provided as collateral by the one or more guarantors to the mortgage includes locking the one or more pre-existing accounts related to the one or more assets provided as collateral by the one or more guarantors to prevent unauthorized release.

38. The system of claim 25, the at least one processor is further configured to process the instructions for establishing, on the lender computer system, one or more data parameters representing the guarantor mortgage comprises causing the system to establish one or more security interests against the one or more assets provided as collateral.

39. The system of claim 26, wherein the one or more pre-determined conditions includes at least one of determining whether a duration of time has elapsed since the implementation of the mortgage, and determining whether the one or more mortgage accounts have a loan-to-value ratio above or below a pre-determined ratio.

40. The system of claim 27, the at least one processor is further configured to apply the one or more rules associated with the one or more pre-determined conditions comprises at least one of causing the system to partially or fully release assets held as collateral, to unlock a locked account holding assets held as collateral, to discharge one or more security interests, and to release funds to a third-party borrower.

41. The system of claim 25, the at least one processor is further configured to monitor the information regarding one or more assets associated with the guarantor mortgage relative to an outstanding mortgage loan amount to determine whether the value of the one or more assets provided as collateral has or has not been impaired.

42. The system of claim 25, the at least one processor is further configured to monitor the information regarding one or more assets associated with the guarantor mortgage relative to an outstanding mortgage loan amount to determine that the one or more assets associated with the guarantor mortgage relative to an outstanding mortgage loan amount have not been improperly released.

43. The system of claim 27, the at least one processor is further configured to release the one or more assets comprises calculating one or more interest payments payable for the one or more assets.

44. The system of claim 27, the at least one processor is further configured to release the one or more assets associated with the guarantor mortgage relative to an outstanding mortgage loan amount includes causing the system to re-invest using the one or more assets associated with the guarantor mortgage.

45. The system of claim 25, the at least one processor is further configured to generate a collateral report indicating at least one of the outstanding balance of the guarantor mortgage, the value of the one or more collateral associated with the guarantor mortgage, the current loan-to-value ratio of the guarantor mortgage, and whether any default events have occurred.

46. The system of claim 45, the at least one processor is further configured to communicate the collateral report to the one or more mortgage insurers.

47. The system of claim 45, the at least one processor is further configured to communicate the collateral report to the one or more guarantors.

48. A computer-readable medium or media comprising non-transient machine-readable programming structures configured for displaying electronic information relating to a guarantor mortgage, the programming structures configured to cause at least one processor to:
receive one or more data sets providing borrower information relevant to a request for a mortgage loan;
receive one or more data sets providing information about one or more collateral amounts to be provided by one or more guarantors as collateral in connection with the request for a mortgage loan, wherein the collateral is supported by one or more assets;
connect, through an application programming interface, with one or more computing systems associated with mortgage insurance providers;
receive, from the one or more computing systems associated with the mortgage insurance providers, one or more data sets providing one or more mortgage insurance rates;
process instructions for execution of at least a portion of a data process executable by one or more networked computing resources, the data process including near real or real time calculation of one or more mortgage interest rates for a guarantor mortgage based upon the one or more data sets providing borrower information, the one or more data sets of the one or more mortgage insurance rates, and the one or more data sets providing information about the one or more assets to be provided as collateral;
dynamically generate a decision-support interface receiving as inputs different combinations of collateral, downpayment, and amortization schedules, the decision-support interface, responsive to the inputs, displaying the one or more mortgage interest rates to the one or more borrowers and to the one or more guarantors;
receive from the one or more borrowers and the one or more guarantors computer signals representing a selection of a particular mortgage interest rate;
automatically generate a schedule for repayment of the collateral from the one or more borrowers to the one or more guarantors, the schedule for repayment of collateral based at least on allocating a portion of a plurality of future mortgage payments to repay an overall value of the collateral over a term of the guarantor mortgage associated with the selected mortgage interest rate;
provide, on the decision support interface, one or more projections of financial metrics modelled based at least on the schedule for repayment of the collateral and the selected mortgage interest rate, the one or more projections provided alongside a generated timeline illustrating release of the collateral over the term;
process instructions for establishing, on a lender computer system, one or more data parameters representing a guarantor mortgage based on (i) the selected mortgage interest rate, (ii) the one or more data sets providing borrower information, and (iii) the one or more data sets providing information about one or more assets to be provided as collateral;
automatically generate and transmit a security interest for registration against the collateral including at least a reference to a mortgage contract corresponding to the guarantor mortgage; and
continuously monitor event data for potential impairments relating to the collateral or default events relating to the guarantor mortgage over the term of the guarantor mortgage.

49. The computer-readable media of claim 48, wherein the programming structures are further configured to cause the at least one processor to establish one or more pre-determined conditions for the full or partial release of the collateral.

50. The computer-readable media of claim 48, wherein the programming structures are further configured to cause the at least one processor to generate periodically or receive periodically at least one of information regarding the repayment of the guarantor mortgage, and information regarding the value of one or more assets associated with the guarantor mortgage relative to an outstanding mortgage loan amount; and
based on the at least one of the information regarding the repayment of the guarantor mortgage and the information regarding the value of one or more assets associated with the guarantor mortgage relative to an outstanding mortgage loan amount, when the one or more pre-determined conditions for the full or partial release of the collateral are satisfied, apply one or more rules to the guarantor mortgage for the full or the partial release of the collateral.

* * * * *